(12) United States Patent
Yamamoto

(10) Patent No.: US 7,125,126 B2
(45) Date of Patent: Oct. 24, 2006

(54) EYE CUP ADJUSTMENT DEVICE FOR OPTICAL APPARATUS SUCH AS BINOCULARS

(75) Inventor: Mitsuo Yamamoto, Yokohama (JP)

(73) Assignees: Nikon Vision Co., Ltd., Tokyo (JP); Nikon Corporation, Tokyo (JP)

( * ) Notice: Subject to any disclaimer, the term of this patent is extended or adjusted under 35 U.S.C. 154(b) by 0 days.

(21) Appl. No.: 11/068,758

(22) Filed: Mar. 2, 2005

(65) Prior Publication Data
US 2005/0200959 A1 Sep. 15, 2005

(30) Foreign Application Priority Data
Mar. 9, 2004 (JP) ............... 2004-065130

(51) Int. Cl.
*G02B 21/00* (2006.01)
*G02B 23/16* (2006.01)
(52) U.S. Cl. ...................... 359/600; 359/407
(58) Field of Classification Search ............ 359/600, 359/511, 611; 396/448
See application file for complete search history.

(56) References Cited

U.S. PATENT DOCUMENTS

| | | | | |
|---|---|---|---|---|
| 4,428,651 A * | 1/1984 | Calcutt | ............ | 359/418 |
| 4,523,818 A | 6/1985 | Lang et al. | ............ | 350/579 |
| 5,672,862 A * | 9/1997 | Ohara et al. | ............ | 250/204 |
| 5,784,207 A | 7/1998 | Satoh | ............ | 359/700 |
| 5,969,858 A | 10/1999 | Funatsu | ............ | 359/415 |
| 6,412,958 B1 * | 7/2002 | Aikawa | ............ | 359/600 |
| 6,580,555 B1 * | 6/2003 | Crista | ............ | 359/426 |
| 2001/0055163 A1 | 12/2001 | Ishikawa et al. | ............ | 359/823 |
| 2003/0035217 A1 * | 2/2003 | Syre et al. | ............ | 359/600 |
| 2005/0024740 A1 | 2/2005 | Smithbaker et al. | ............ | 359/694 |

FOREIGN PATENT DOCUMENTS

| | | |
|---|---|---|
| GB | 687383 | 2/1953 |
| JP | 8-160494 | 6/1996 |
| JP | 2001-324681 | 11/2001 |
| JP | U3090513 | 9/2002 |

\* cited by examiner

*Primary Examiner*—Mark A. Robinson
*Assistant Examiner*—Mark Consilvio
(74) *Attorney, Agent, or Firm*—Miles & Stockbridge PC

(57) ABSTRACT

An eyepiece member comprises an eye cup provided on the outer circumference of an eyepiece barrel that holds an eyepiece lens, the eye cup being movable relative to the eyepiece barrel along the direction of the optical axis of the eyepiece lens, and a positioning members for the eye cup provided on at least one of a portion of the eyepiece barrel and a portion of the eye cup that are opposed to each other, intervals of the positioning members being relatively smaller in the eye cup pull-out side in which the eye cup is pulled toward the user when used than in the eye cup push-in side.

18 Claims, 10 Drawing Sheets

EYE CUP ADJUSTMENT DEVICE FOR OPTICAL APPARATUS SUCH AS BINOCULARS

This application claims the benefit of Japanese Patent application No. 2004-065130 which is hereby incorporated by reference.

BACKGROUND OF THE INVENTION

1. Field of the Invention

The present invention relates to an eyepiece device and a binocular.

2. Related Background Art

Eyepiece devices of optical apparatuses such as binoculars are provided with an eye cup for the purpose of preventing entrance of exterior light or making it easy to keep the positional relationship between the eyepiece device and the eyes constant. Some eyepiece devices having an eye cup are equipped with a mechanism for allowing the eye cup to move along the optical axis relative to the eyepiece barrel.

A known mechanism for allowing movement of the eye cup along the optical axis direction is provided with a twist-up ring that is movable along the optical axis direction relative to the eyepiece barrel, a twist-up adjusting pin provided on the eyepiece barrel and three pin engagement portions provided on the twist-up ring for retaining the twist-up pin (see Japanese Utility Model No. 3090513). With this mechanism, the eye cup can be retained steadily at three positions with respect to the optical axis direction.

When a person wearing eyeglasses uses an eyepiece device that allows adjustment of the position of the eye cup, the eye cup will be used in the state in which it is pushed (or retracted) into the eyepiece barrel (see FIGS. 1 and 2).

Letting D be the distance from the surface of the eyepiece lens G1 that constitutes the last lens in the optical system to the surface of the eyeglass lens G4 (or G5), t be the thickness of the eyeglass lens G4 (or G5), S1 be the distance from the backside surface of the eyeglass lens G4 (or G5) to the surface of the cornea E, S2 be the distance from the surface of the cornea E to the iris I, and X be the distance from the surface of the eyepiece lens G1 that constitutes the last lens in the optical system to the iris I, the equation $X=D+t+S1+S2$ holds.

The distance from the surface of the eyepiece lens G1 that constitutes the last lens in the optical system to the surface of the eyeglass lens G5 for farsightedness is generally smaller than the distance from the surface of the eyepiece lens G1 that constitutes the last lens in the optical system to the surface of the eyeglass lens G4 for nearsightedness. In addition, the thickness t of the eyeglass lens G5 for farsightedness is larger than the thickness t of the eyeglass lens G4 for nearsightedness.

Generally, the thickness t of the eyeglass lens G4 (or G5) is larger than 1.1 mm, the distance S1 from the backside surface of the eyeglass lens G4 (or G5) to the surface of the cornea E is larger than 12 mm, and the distance S2 from the surface of the cornea E to the iris I is approximately 3 mm (equivalent value in the air), and therefore in typical cases, the distance X from the surface of the eyepiece lens G1 that constitutes the last lens in the optical system to the iris I is larger than 20 mm.

The distance of the position of the eye point (i.e. the position at which a pupil is formed) EP of optical apparatuses such as binoculars from the most eye side surface of the eyepiece lens (that is, the surface of the eyepiece lens which surface is closest to the person using an optical apparatus.) is generally smaller than 20 mm. Accordingly, even when the eye cup is set to the fully retracted (or pushed in) state, the position of the eye point EP and the position of the iris of a person wearing eyeglasses do not coincide with each other. This means that eyeglass wearers cannot adjust the position of the eye cup to allow the position of their iris I to coincide with the eye point, and they cannot see whole the field of view.

On the other hand, when a person who is not wearing eyeglasses (i.e. a person who observes with naked eye) uses an eyepiece device that allows adjustment of the position of the eye cup, the eye cup will be used in the state in which it is extended (or pulled out) from the eyepiece barrel (see FIGS. 3 and 4).

Each one has his own face shape and there are differences in the shape of the faces. Especially, there are differences in the shape of the eye pit (or differences between sunken eyes, clear-cut eyes etc.) depending on the racial difference between the Orientals and the Westerners, the difference in stages of growth between adults and children or the sexual difference between men and women.

Accordingly, in the case that the eye cup is used in a state where it is pulled out from the eyepiece barrel, it is necessary for a person who observes with naked eye to finely adjust the position of the eye cup (by, for example, changing the distance L between the outer end of the eye cup and the iris I) to adjust the position of the iris I to coincide with the position of the eye point EP.

However, the eyepiece device disclosed in the above-mentioned Japanese Utility Model No. 3090513 suffers from the problem that when the eye cup is pulled out from the eyepiece barrel, fine position adjustment cannot be carried out in the range that requires finer adjustment, since the three pin engagement portions are formed at equal intervals.

SUMMARY OF THE INVENTION

The present invention has been made in view of the above circumstances, and an object of the present invention is to make it possible for a person observing with naked eyes who uses the eye cup in a state pulled out from the eyepiece barrel to adjust the position of the eye cup finely in the range that requires finer adjustment so that the eye cup can be set at a position optimum for observation.

An eyepiece device according to the present invention that is intended to achieve the above object comprises an eye cup provided on the outer circumference of an eyepiece barrel that holds an eyepiece lens, the eye cup being movable relative to the eyepiece barrel in the direction of the optical axis of said eyepiece lens, a projection provided on one of a portion of the eyepiece barrel and a portion of the eye cup that are opposed to each other, and at least three retaining portions provided on the other of the portion of said eyepiece barrel and the portion of said eye cup that are opposed to each other for retaining said projection, wherein the pitch of the retaining portions is designed in such a way as to be relatively smaller in the eye cup pull-out side than in the eye cup push-in side.

In the eyepiece device according to the present invention, it is preferable that the interval between a pull-out side retaining portion that is adapted to retain the aforementioned projection when the eye cup is fully pulled out and a first intermediate retaining portion that is adjacent to this pull-out side retaining portion is smaller than the interval between a push-in side retaining portion that is adapted to retain the aforementioned projection when the eye cup is fully pushed in and a second intermediate retaining portion that is adjacent to this push-in side retaining portion (each of the retaining portions mentioned here being one of said at least three retaining portions).

In the eyepiece device according to the present invention, it is preferable that eye cup be rotatable about the optical axis relative to the eyepiece barrel, the aforementioned projection be a projecting portion formed by bending a leaf spring attached on the outer circumferential surface of the eyepiece barrel, and the at least three retaining portions be a plurality of grooves extending along the optical axis direction formed on the inner circumferential surface of the eye cup.

A binocular according to the present invention is characterized by having the above-described eyepiece device according to the present invention.

As per the above, according to the eyepiece device of the present invention, when a person who observes with naked eye uses the eyepiece device with the eye cup being extended, the position of the eye cup can be adjusted finely in the range in which finer adjustment is required. Accordingly, the eye cup can be set to a position optimum for observation.

BRIEF DESCRIPTION OF THE DRAWINGS

FIG. 6 is a schematic cross sectional view showing the eyepiece device in the state in which the eye cup has been fully pushed in.

DESCRIPTION OF THE PREFERRED EMBODIMENTS

In the following, embodiments of the present invention will be described with reference to the drawings.

Figure 1:
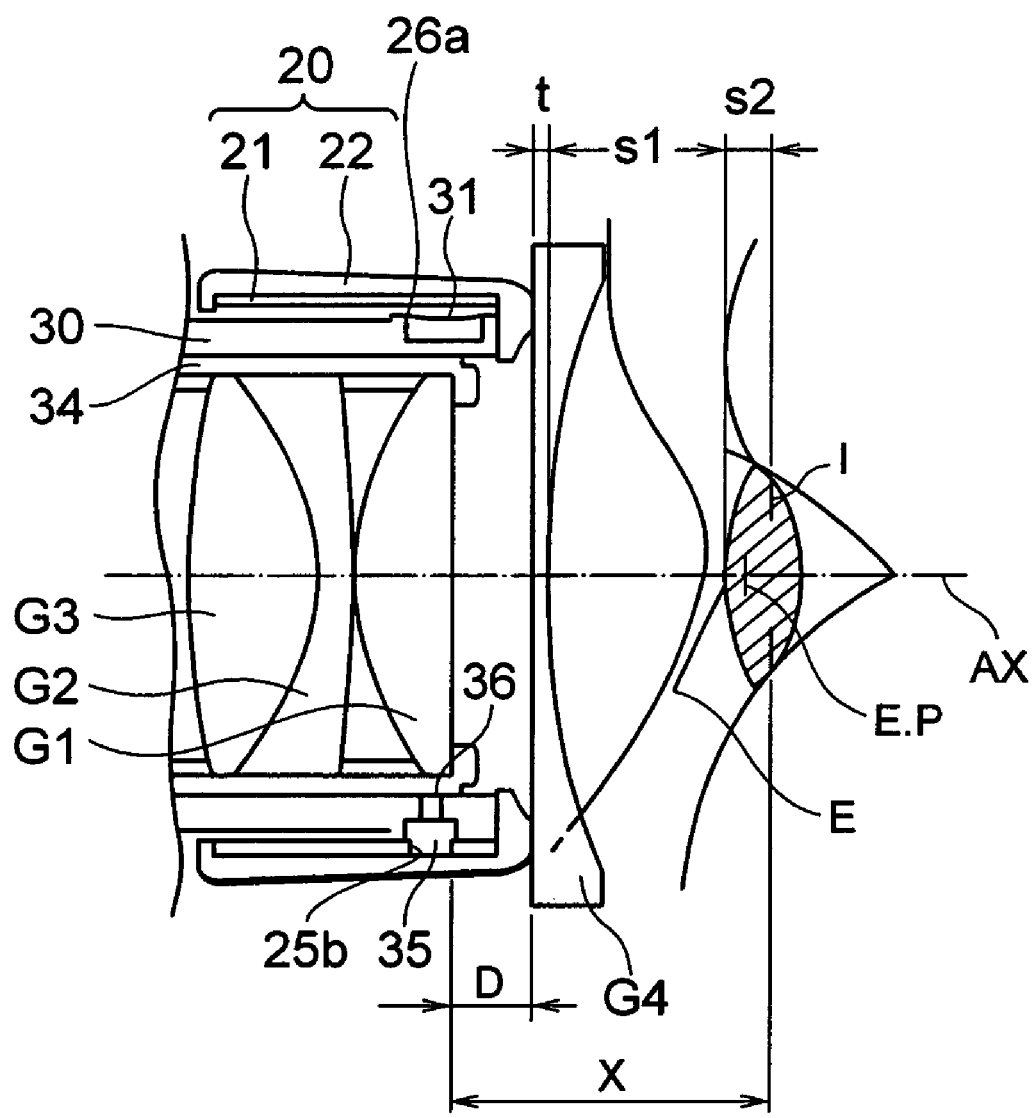
FIG. 1 is a schematic cross sectional view showing a state in which an eyepiece device according to a first embodiment of the present invention is used by a person wearing eyeglasses for nearsightedness.
Figure 2:
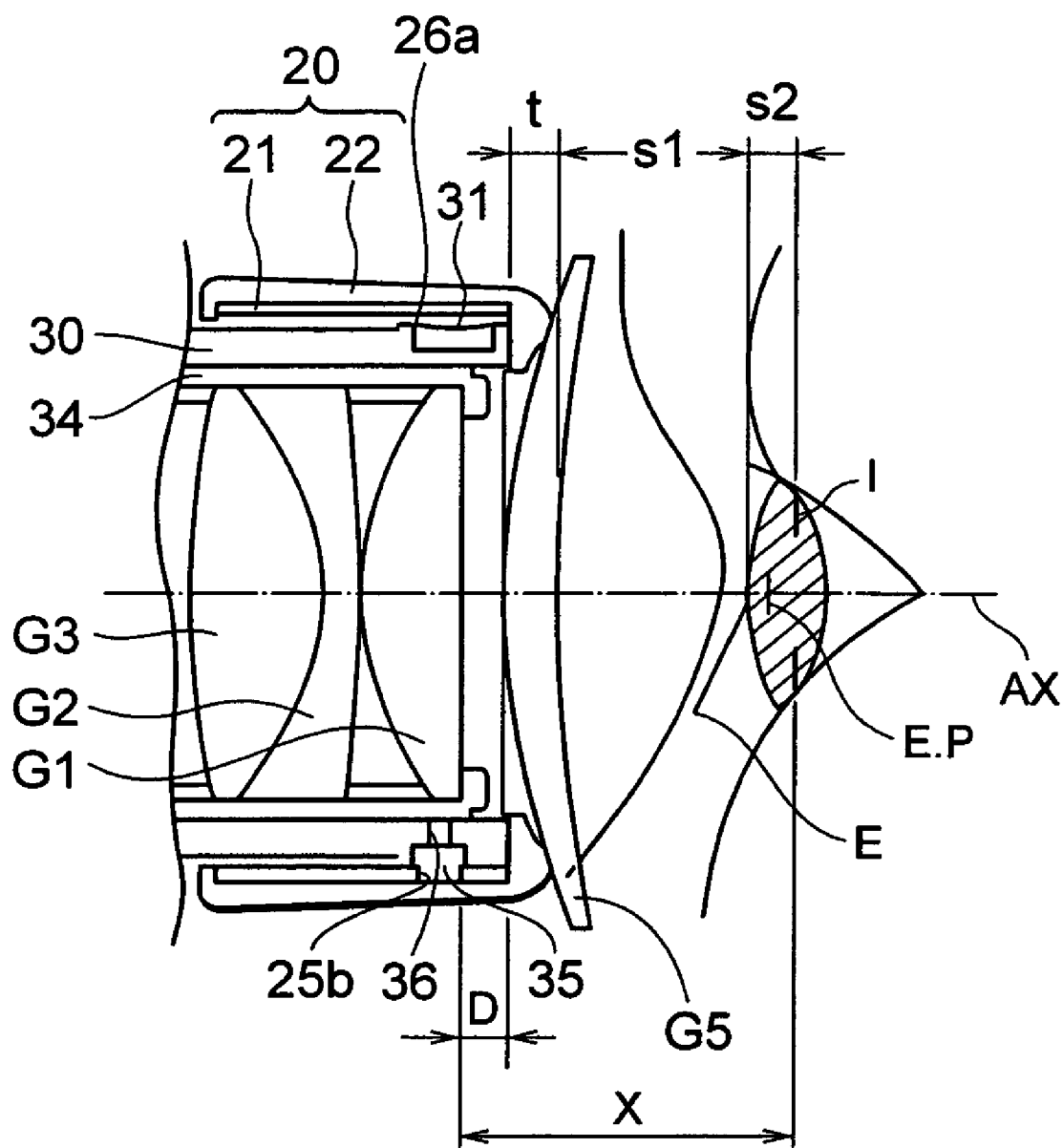
FIG. 2 is a schematic cross sectional view showing a state in which the same eyepiece apparatus is used by a person wearing eyeglasses for farsightedness.
Figure 3:
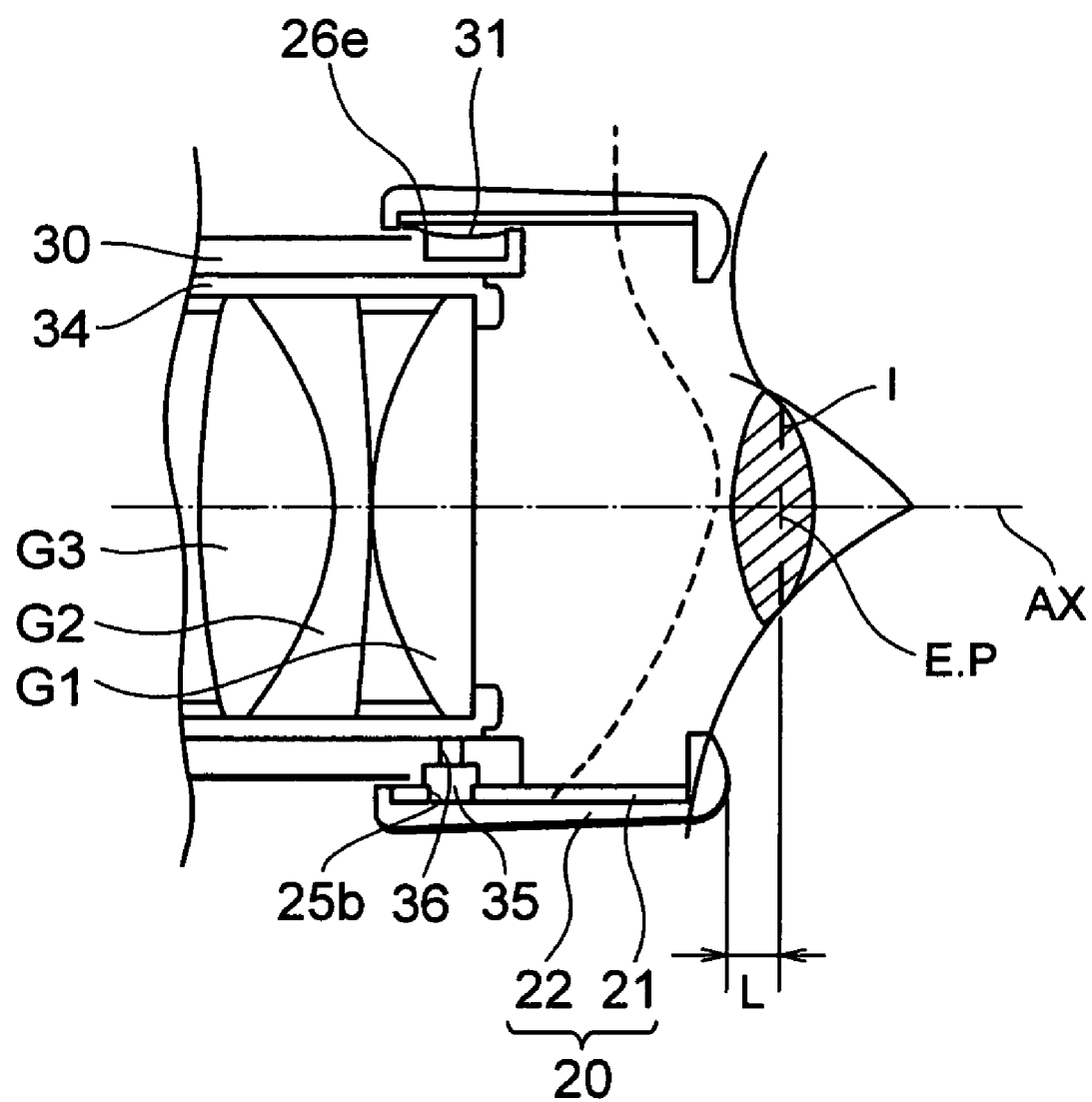
FIG. 3 is a schematic cross sectional view showing a state in which the same eyepiece device is used by a person who observes with naked eye.
Figure 4:
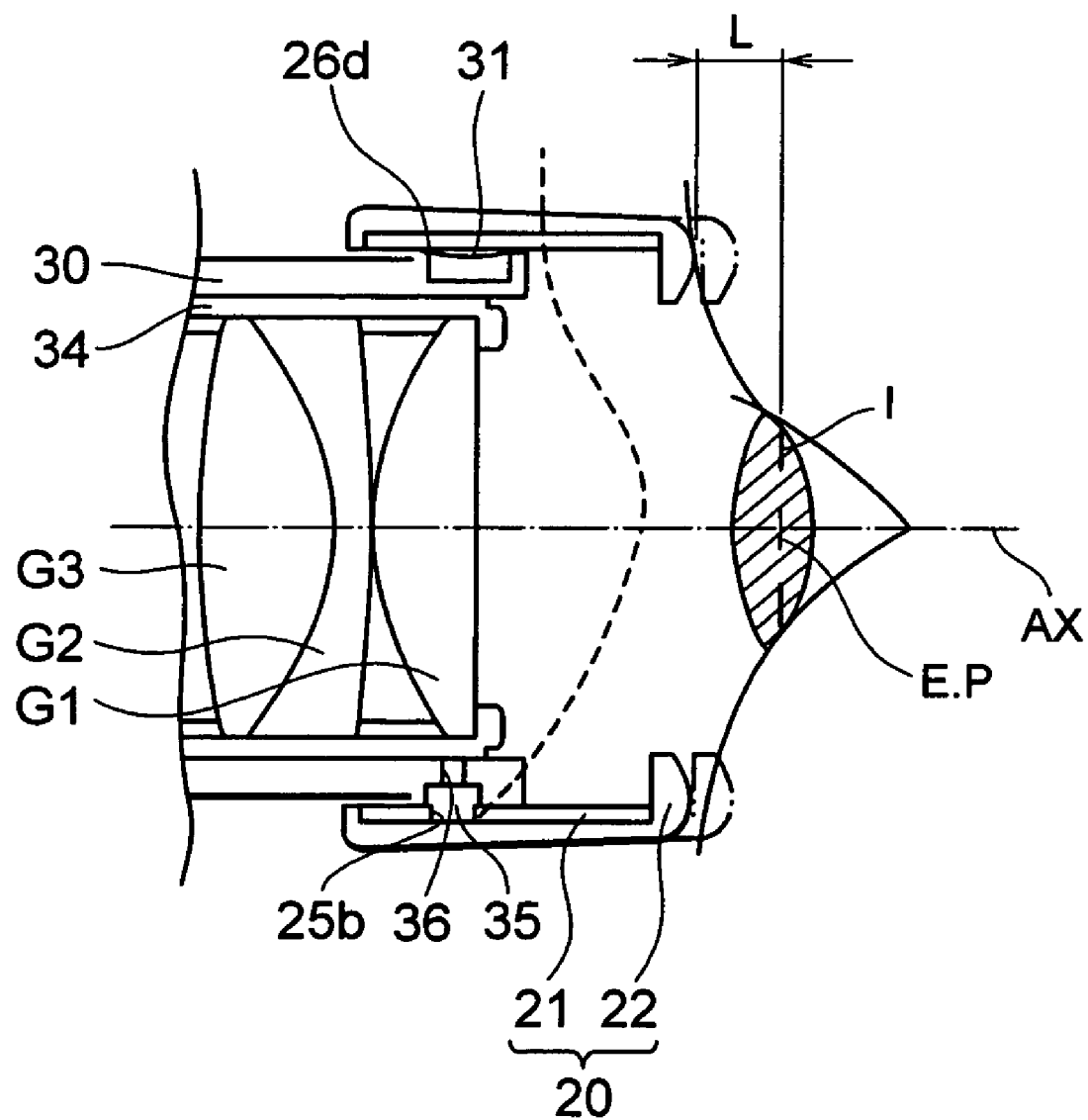
FIG. 4 is a schematic cross sectional view showing a state in which the same eyepiece device is used by a person who observes with naked eye.
Figure 5:
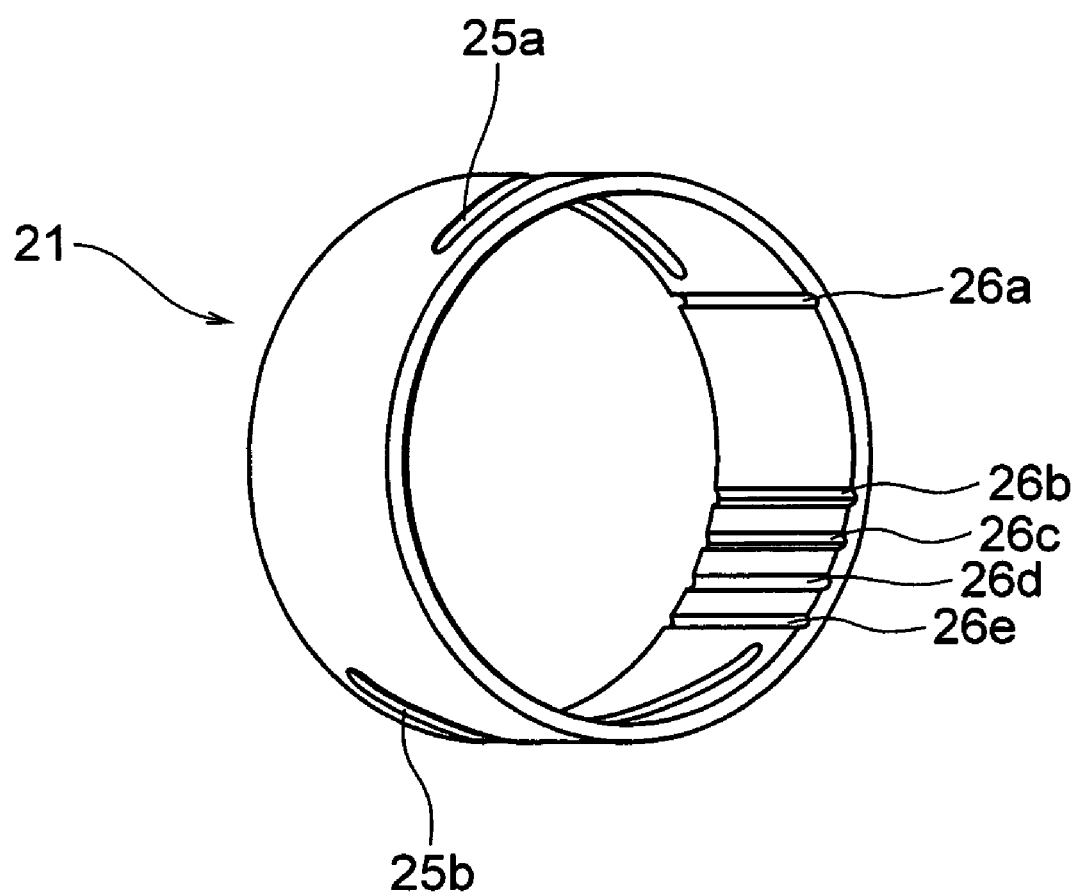
FIG. 5 is a perspective view showing a ring-shaped member that constitutes a part of the eye cup.

FIG. 1 is a schematic cross sectional view showing a state in which an eyepiece device according to the first embodiment of the present invention is used by a person wearing eyeglasses for nearsightedness. FIG. 2 is a schematic cross sectional view showing a state in which the same eyepiece apparatus is used by a person wearing eyeglasses for farsightedness. FIGS. 3 and 4 are schematic cross sectional views showing states in which the same eyepiece device is used by a person who observes with naked eye. FIG. 5 is a perspective view showing a ring-shaped member that constitutes a part of the eye cup.

In connection with the above, FIG. 3 shows the state in which the eye cup 20 is in its fully pulled-out state, and FIG. 4 shows the state in which the eye cup 20 is slightly pushed in from the fully pulled-out state.

The eye cup 20 includes the ring-shaped member 21 rotatably fitted on the outer circumferential surface of an eyepiece barrel 30 and a rubber eye cup 22 that covers the outer circumference of the ring-shaped member 21. The ring-shaped member 21 is made of a metal or a synthetic resin. The rubber eye cup 22 is attached on the ring-shaped member 21 using an adhesive (not shown).

The eyepiece barrel 30 houses a lens holding frame 34 that holds eyepiece lenses G1, G2 and G3. The eyepiece lenses G1, G2 and G3 functions to magnify an image to be observed.

Female screw holes 36 are formed in the radial direction on the outer circumferential surface of the eyepiece barrel 30 at an interval of 180°. Screws 35 are screwed into the female screw holes 36 (only one of the screws 35 is shown in FIG. 1). The female screw holes may be replaced by through holes so that pins are pressed into them.

A leaf spring 31 for a click-stop mechanism is attached on the outer circumferential surface of the eyepiece barrel 30. The leaf spring 31 is formed by a bending process to have a projecting portion (or a projection) 32 (see FIGS. 6 to 9) protruding in the radial direction away from the optical axis, formed at its center.

The ring-shaped member 21 has two cam grooves 25a and 25b for slidably retaining the heads of the respective screws 35, formed along the circumferential direction at equal intervals. The cam grooves 25a and 25b are extending linearly in the same oblique direction from one opening of the ring-shaped member 21 to the other.

On the inner circumferential surface of the ring-shaped member 21, five click grooves (or retaining portions) 26a to 26e extending along the optical axis AX direction, into which the projecting portion 32 of the leaf spring 31 for click is to be received, are formed (see FIG. 5). The click grooves 26a to 26e are formed in such a way as to satisfy the following condition: the interval between click groove 26e (the pull-out side retaining portion) and click groove 26d (first intermediate retaining portion) in the push-in side is smaller than the interval between click groove 26b (the second intermediate retaining portion) and click groove 26a (the push-in side retaining portion) in the pull-out side.

Figure 6:
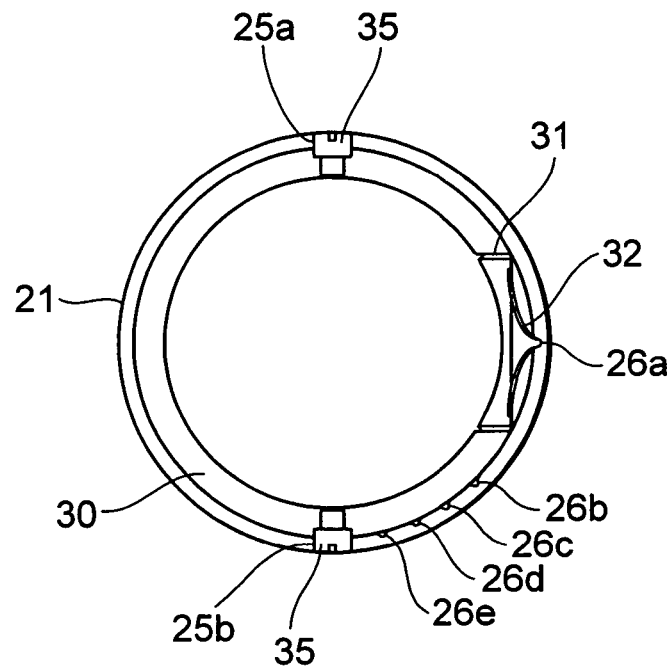
Figure 7:
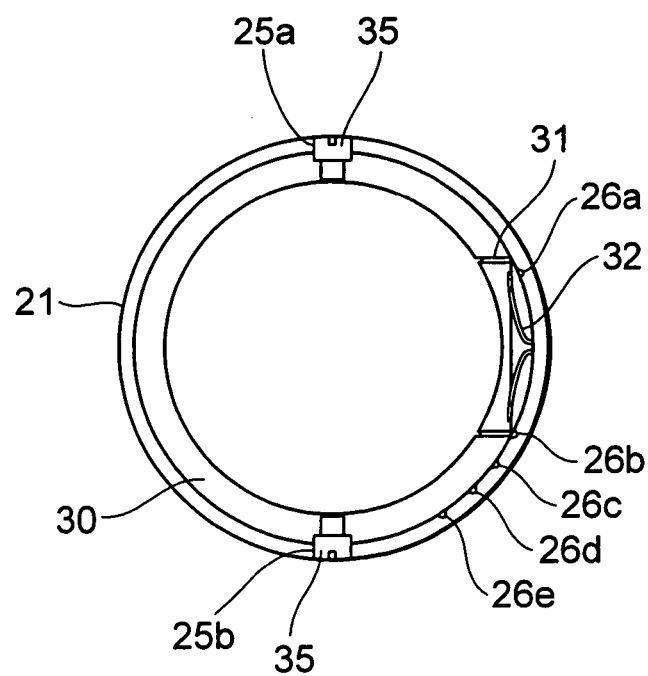
FIG. 7 is a schematic cross sectional view showing the eyepiece device in the state in which the projecting portion 32 is at a position between click groove 26a and click groove 26b.
Figure 8:
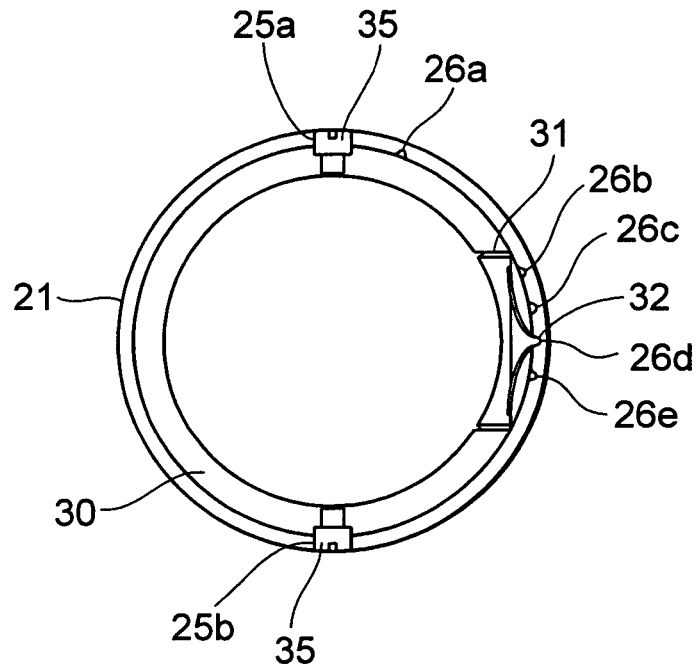
FIG. 8 is a schematic cross sectional view showing the eyepiece device in the state in which the projecting portion is received in click groove 26d.
Figure 9:
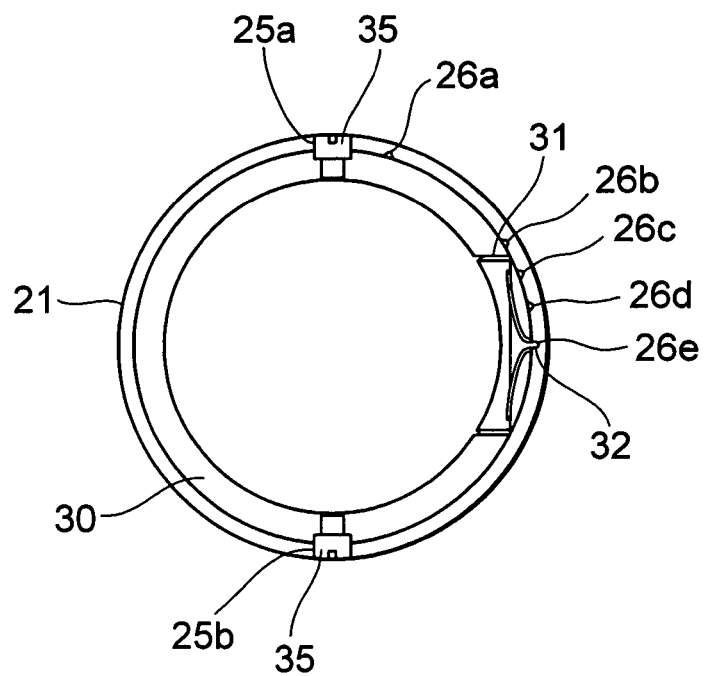
FIG. 9 is a schematic cross sectional view showing the eyepiece device in the state in which the projecting portion 32 is received in click groove 26e.

FIG. 6 is a schematic cross sectional view showing the eyepiece device in the state in which the eye cup 20 has been fully pushed in (or fully retracted). FIG. 7 is a schematic cross sectional view showing the eyepiece device in the state in which the projecting portion 32 is at a position between click groove 26a and click groove 26b. FIG. 8 is a schematic cross sectional view showing the eyepiece device in the state in which the projecting portion 32 is received in click groove 26d. FIG. 9 is a schematic cross sectional view showing the eyepiece device in the state in which the projecting portion 32 is received in click groove 26e.

In the state shown in FIG. 6, the projecting portion 32 of the leaf spring 31 is received in click groove 26a. FIG. 6 corresponds to FIGS. 1 and 2 that show the state in which the eye cup is fully pushed in. The distance from the eyepiece lens G1 to the outer end of the eye cup 20 is shortest in the state shown in FIG. 6. Since the projecting portion 32 is fitted in click groove 26a by means of the leaf spring 31, movement of the eye cup is prevented unless a force larger than a certain value is exerted in the rotational direction of the eye cup 20. Consequently, the distance from the eye piece lens G1 to the outer end of the eye cup 20 is kept constant.

From this state, the eye cup may be rotated by exerting a force larger than a certain value on the eye cup in the anticlockwise direction to dislocate the projecting portion 32 out of click groove 26a. In this process, since the projecting portion 32 is pressed against the inner circumferential surface of the ring-shaped member 21 by a biasing force exerted by the leaf spring 31 (see FIG. 7), a resisting force acts on the operator's hand. With the rotation of the eye cup 20, the distance from the eyepiece lens G1 to the outer end of the eye cup 20 gradually increases.

When the eye cup 20 is rotated by a predetermined angle, the projecting portion 32 fits into click groove 26b. This gives a click feeling (that is, a feeling with which the fitting of the projecting portion into the click groove 26b can be recognized). In this state, since the projecting portion 32 is fitted in click groove 26b, movement of the eye cup is prevented unless a force larger than a certain value is exerted in the rotational direction of the eye cup 20. Consequently, the distance from the eye piece lens G1 to the outer end of the eye cup 20 is kept constant.

Similarly, the groove in which the projecting portion 32 is fitted can be changed sequentially from click groove 26b to click groove 26c, and further changed from click groove 26c to click groove 26d (see FIG. 8) by exerting a rotational force larger than a certain valued on the eye cup 20. The state shown in FIG. 8 corresponds to the state shown in FIG. 4. When the projecting portion 32 is fitted into click grooves 26c or 26d, a click feeling is generated, and in addition, the distance from the eyepiece lens G1 to the outer end of the eye cup 20 can be kept constant.

The groove in which the projecting portion 32 is fitted can be changed further from click groove 26d to click groove 26e (see FIG. 9) by exerting a rotational force larger than a certain value on the eye cup 20. When the projecting portion 32 is fitted into click groove 26e, a click feeling is generated. The state shown in FIG. 9 corresponds to the state shown in FIG. 3 in which the eye cup 20 is fully pulled out (or fully extended). The distance from the eyepiece lens G1 to the outer end of the eye cup is longest in the state shown in FIG. 9. Since the projecting portion 32 of the leaf spring 31 is fitted in click groove 26e, movement of the eye cup is prevented unless a force larger than a certain value is exerted in the rotational direction of the eye cup 20. Consequently, the distance from the eye piece lens G1 to the outer end of the eye cup 20 is kept constant.

According to this embodiment, since the position of the eye cup 20 relative to the eyepiece barrel 30 can be adjusted finely, a person who observes with naked eye can adjust the position of the eye cup he or she uses to a position optimum for observation.

The pitches of click grooves 26a to 26e illustrated above are not essential, but they may be modified into, for example, those shown in FIGS. 10 to 13 so long as the condition presented below is satisfied.

That is, the condition that the interval between the pull-out side click groove in which the projecting portion 32 is to fit when the eye cup is fully pulled out and the click groove adjacent thereto is smaller than the interval between the push-in side click groove in which the projecting portion 32 is to fit when the eye cup 20 is fully pushed in and the click groove adjacent thereto.

FIGS. 10 to 13 are schematic cross sectional view showing modifications of the ring-shaped member.

Figure 10:
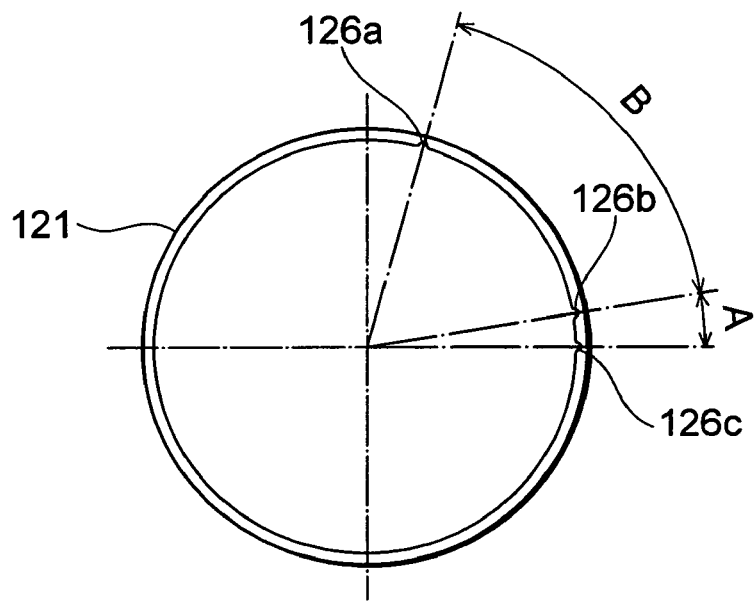
FIG. 10 is a schematic cross sectional view showing a ring shaped member.

A first modification of the ring-shaped member 121 shown in FIG. 10 has three click grooves (or retaining portions) 126a, 126b and 126c formed on its inner circumferential surface.

Letting A be the interval between click groove 126b (or the first intermediate retaining portion) and click groove 126c (or the pull-out side retaining portion) and B be the interval between click groove 126a (or the push-in side retaining portion) and click groove 126b (or the second intermediate retaining portion), the condition B>A holds, namely the above-mentioned condition is met.

Figure 11:
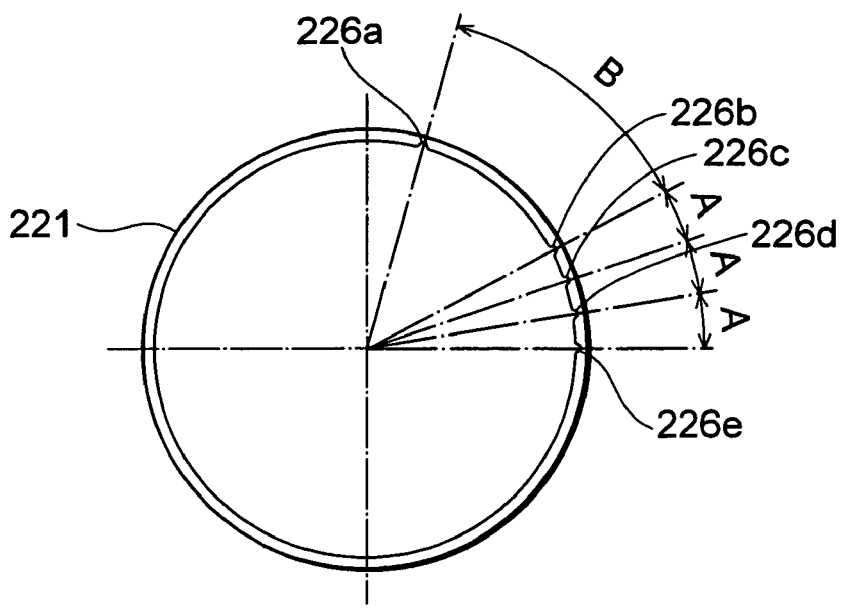
FIG. 11 is a schematic cross sectional view showing a ring shaped member.

FIG. 11 shows a second modification of the ring-shaped member 221, which has five click grooves 226a, 226b, 226c, 226d and 226e formed on its inner circumferential surface. This ring-shaped member 221 has the structure same as the ring-shaped member 21 of the above-described embodiment.

The interval between click groove 226b and click groove 226c, the interval between click groove 226c and click groove 226d and the interval between click groove 226d (or the first intermediate retaining portion) and click groove 226e (or the pull-out side retaining portion) are equal (i.e. interval A). Letting B be the interval between click groove 226a (or the push-in side retaining portion) and click groove 226b (or the second intermediate retaining portion), the condition B>A holds, namely the above-mentioned condition is met.

Figure 12:
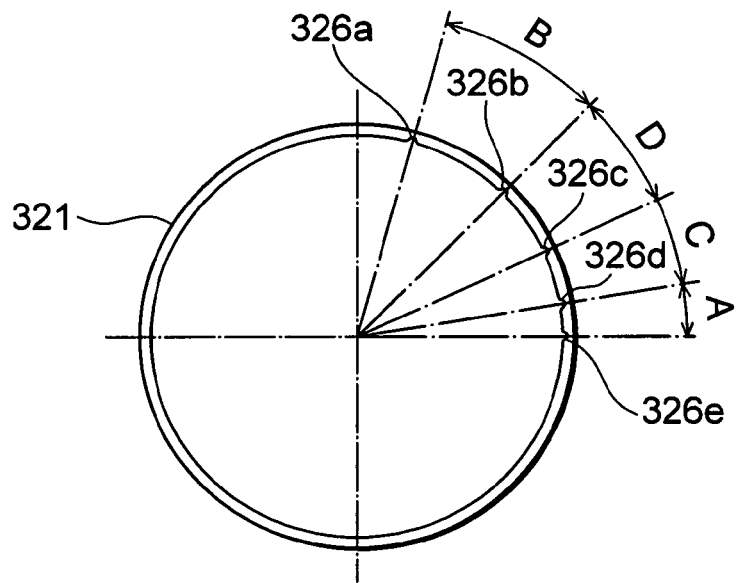
FIG. 12 is a schematic cross sectional view showing a ring shaped member.

FIG. 12 shows a third modification of the ring-shaped member 321, which has five click grooves (or retaining portions) 326a, 326b, 326c, 326d and 326e formed on its inner circumferential surface.

The interval between click groove 326b and click groove 326c, the interval between click groove 326c and click groove 326d and the interval between click groove 326d (or the first intermediate retaining portion) and click groove 326e (or the pull-out side retaining portion) are D, C and A respectively. Letting B be the interval between click groove 326a (or the push-in side retaining portion) and click groove 326b (or the second intermediate retaining portion), the condition B>A holds, namely the above-mentioned condition is met. In addition, the condition A≠C holds.

Figure 13:
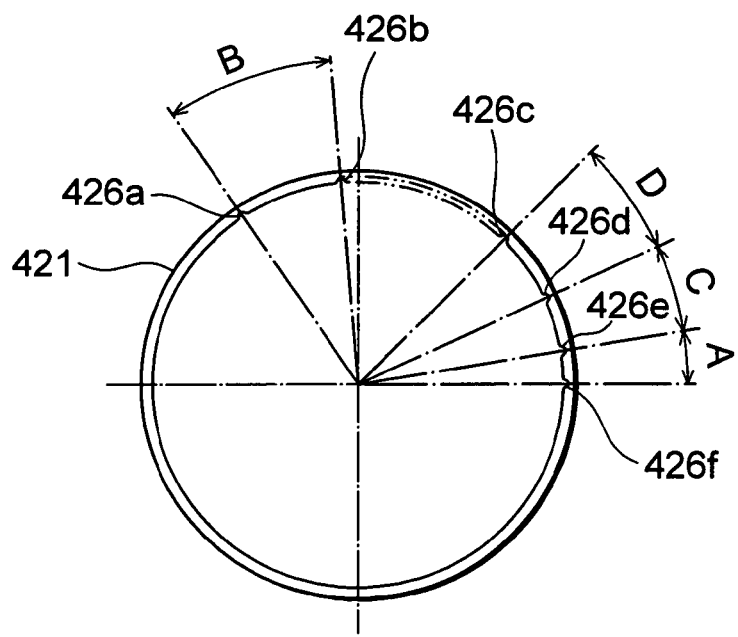
FIG. 13 is a schematic cross sectional view showing a ring shaped member.

FIG. 13 shows a fourth modification of the ring-shaped member 431, which has six click grooves (or retaining portions) 426a, 426b, 426c, 426d, 426e and 426f formed on its inner circumferential surface.

The interval between click groove 426c and click groove 426d is D, the interval between click groove 426d and click groove 426e is C, and the interval between click groove 426e (or the first intermediate retaining portion) and click groove 426f (or the pull-put side retaining portion) is A. Letting B be the interval between click groove 426a (or the push-in side retaining portion) and click groove 426b (or the second intermediate retaining portion), the condition B>A holds, namely the above-mentioned condition is met. In addition, the condition A≠B, C holds. One or more additional grooves may be provided between click groove 426b and click groove 426c, though such grooves are not shown in the drawings.

Figure 14:
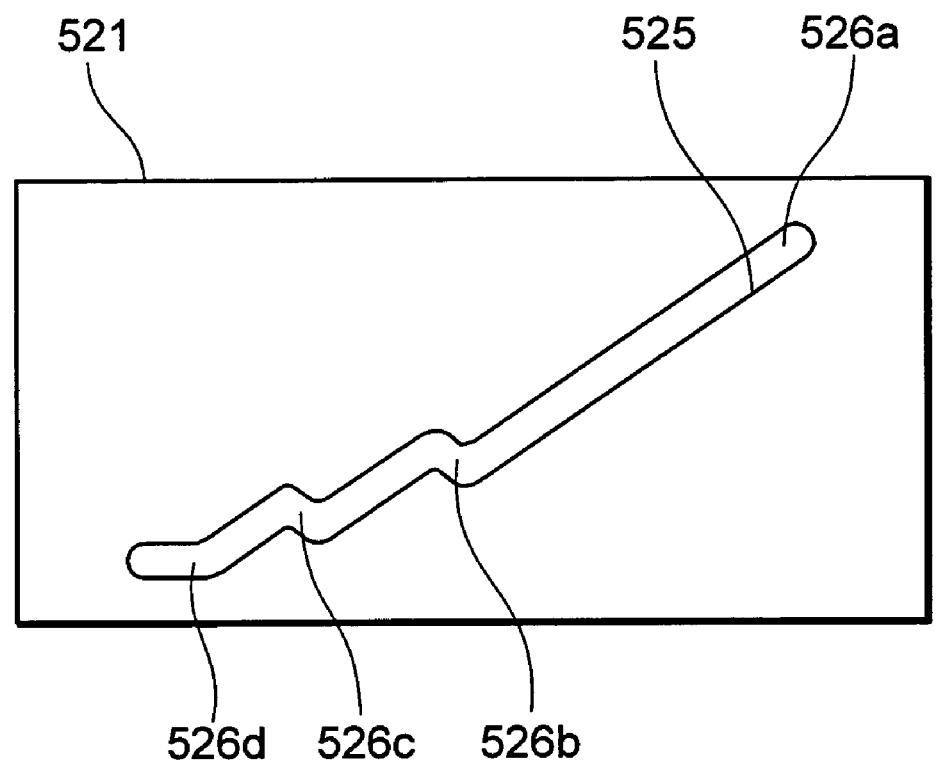
FIG. 14 is a schematic cross sectional view showing a ring shaped member that constitutes a part of an eye cup of an eyepiece device according to a second embodiment of the present invention.

FIG. 14 is a side view showing a ring-shaped member that constitutes a part of the eye cup of an eye piece device according to the second embodiment of the present invention.

In this eye cup, the ring-shaped member 521 that constitutes a part of the eye cup is moved in the optical axis direction (in the vertical direction in FIG. 14) by sliding an adjust pin (or a projection) formed on the eyepiece barrel (not shown) along a slot 525 formed on the ring-shaped member 521.

In this second embodiment, the pitch of four pin engagement portions (or retaining portions) 526a, 526b, 526c, 526d formed in the slot 525 for retaining the projection is designed in such a way as to be made smaller in the range in which the ring-shaped member 521 is pulled out (i.e. moved upwardly in FIG. 14) more than a certain amount.

According to the second embodiment, advantageous effects similar to those of the first embodiment can be achieved.

Although in the above-described embodiments, the retaining portions in the form of the click grooves 126a–126c, 226a–226e, 326a–326e, 426a–426f or the pin engagement portions 526a–526c are provided on the ring-shaped member 21, 121, 221, 321, 421, the click grooves and the pin engagement portions may be provided on the eyepiece barrel 30.

In the present invention, the projection may be provided as a separate member attached to the eyepiece barrel or the eye cup, or alternatively, the projection may be provided on the eyepiece barrel or the eye cup by directly machining the eyepiece barrel or the eye cup.

What is claimed is:

1. An eyepiece member, comprising:
   an eye cup provided on a circumference of an eyepiece barrel that holds an eyepiece lens, the eye cup being movable relative to said eyepiece barrel along a direction of an optical axis of said eyepiece lens,
   wherein there are at least four discrete stop positions of said eye cup at which a projection provided on one of a portion of said eyepiece barrel and a portion of said eye cup is received in a positioning stop member provided on the other of said portions,
   at least two of said stop positions are intermediate stop positions disposed closer to a most pulled-out position than to a most pushed-in position of said eye cup, and
   intervals between successive ones of said four stop positions increase in a direction from the most pulled-out position toward the most pushed-in position.

2. An eyepiece member according to claim 1, wherein there are more than four of said stop positions.

3. An eyepiece member according to claim 1, wherein at least three of said stop positions are intermediate stop positions between the most pulled-out position and the most pushed-in position.

4. An eyepiece member according to claim 1, wherein said positioning stop members are recesses.

5. An eyepiece member according to claim 4, wherein said intervals correspond to circumferential intervals between the recesses.

6. An eyepiece member according to claim 5, wherein the recesses are grooves.

7. An eyepiece member according to claim 6, wherein each of said grooves extends along said optical axis.

8. An eyepiece member according to claim 4, wherein the projection is biased to insert into the recesses.

9. An eyepiece member according to claim 4, wherein said projection is a portion of a spring member.

10. An eyepiece member according to claim 1, wherein one of said eyepiece barrel and said eye cup has a cam groove, the other of said eyepiece barrel and said eye cup has a cam pin, and said stop positions are defined by corresponding portions of said cam groove which cooperate with said cam pin.

11. An eyepiece member according to claim 10, wherein said cam pin comes in contact with respective ends of said cam groove when said eye cup is fully pushed in and fully pulled out.

12. An eyepiece member according to claim 1, wherein one of said eyepiece barrel and said eye cup has a cam groove, the other of said eyepiece barrel and said eye cup has a cam pin, and said cam pin comes in contact with respective ends of said cam groove when said eye cup is fully pushed in and fully pulled out.

13. An eyepiece member, comprising:
    an eye cup provided on a circumference of an eyepiece barrel that holds an eyepiece lens, the eye cup being movable relative to said eyepiece barrel along a direction of an optical axis of said eyepiece lens,
    wherein a click-stop mechanism is provided which defines at least four stop positions of said eye cup,
    two or more of said stop positions are intermediate stop positions disposed closer to a most pulled-out position than to a most pushed-in position of said eye cup, and
    intervals between successive ones of said four stop positions increase in a direction from the most pulled-out position toward the most pushed-in position of said eye cup.

14. An eyepiece member according to claim 13, wherein said intervals correspond to circumferential intervals between stop recesses of said click-stop mechanism.

15. An eyepiece member according to claim 14, wherein the recesses are grooves.

16. An eyepiece member according to claim 15, wherein each of said grooves extends along said optical axis.

17. An eyepiece member according to claim 14, wherein said click-stop mechanism includes a portion of a spring member that inserts into said recesses.

18. An eyepiece member according to claim 13, wherein one of said eyepiece barrel and said eye cup has a cam groove, the other of said eyepiece barrel and said eye cup has a cam pin, and said cam pin comes in contact with respective ends of said cam groove when said eye cup is fully pushed in and fully pulled out.

* * * * *